March 18, 1924.
G. F. IRONS
REFRIGERATOR DRIP PAN
Filed July 6, 1922
1,487,065
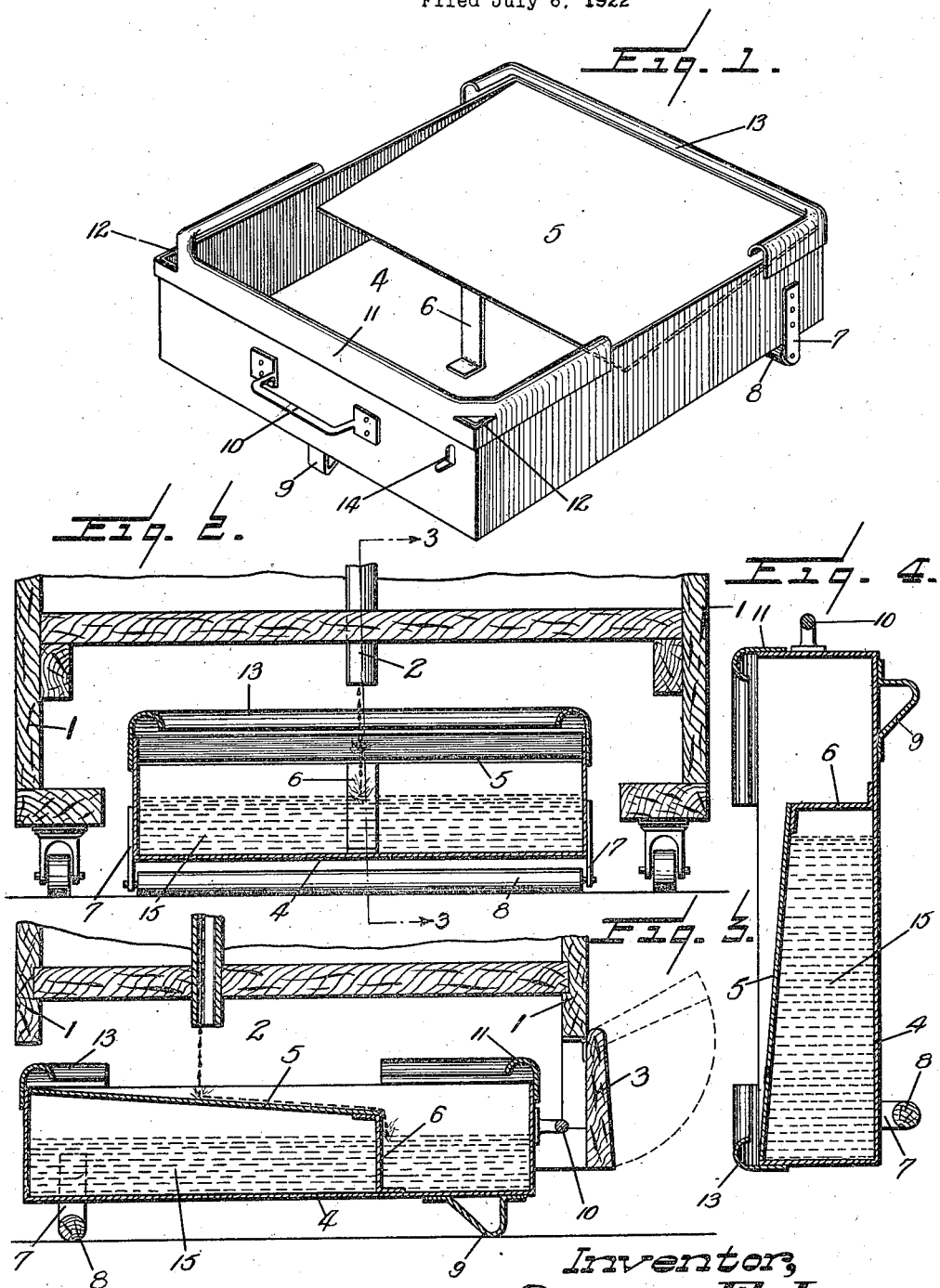
Inventor,
GEORGE F. IRONS.
By Fetherstonhaugh & Co.
Attys.

Patented Mar. 18, 1924.

1,487,065

UNITED STATES PATENT OFFICE.

GEORGE FALCONER IRONS, OF REGINA, SASKATCHEWAN, CANADA.

REFRIGERATOR DRIP PAN.

Application filed July 6, 1922. Serial No. 573,138.

*To all whom it may concern:*

Be it known that I, GEORGE FALCONER IRONS, of the city of Regina, in the Province of Saskatchewan, Canada, have invented certain new and useful Improvements in Refrigerator Drip Pans, of which the following is the specification.

My invention relates to improvements in refrigerator drip pans and the object of the invention is to devise a pan which can be readily inserted under the refrigerator and removed therefrom with the minimum of trouble. A further object is to devise a pan which can be readily moved about when filled with water and a still further object is to devise a pan in which there will be no liability of water splashing over the upper edge of the same onto the floor.

My invention consists of a drip pan constructed and arranged all as hereinafter more particularly described and illustrated in the accompanying drawing in which:

Fig. 1 represents a perspective view of a pan constructed according to my invention.

Fig. 2 is a vertical cross sectional view of the lower part of a refrigerator showing the drip pipe and my drip pan thereunder.

Fig. 3 is a vertical sectional view through the line 3—3 Figure 2, and

Fig. 4 is a section through the pan, said pan being upended to the upright or carrying position.

Like characters of reference indicate corresponding parts in the different views.

1 is the refrigerator. 2 is the drip pipe from the ice box. 3 is the front flap hinged at the bottom of the refrigerator and adapted to be turned up in order that the drip pan may be inserted thereunder.

4 is my drip pan preferably constructed of rectangular shape and partially covered by the inclined top 5 extending from one end thereof to intermediately of the length of the pan, said inclined top sloping downwardly towards its free edge which is supported by a suitable bracket 6 mounted on the bottom of the pan. 7 are depending bearing brackets secured to the sides of the pan and extending below the same. 8 is a suitable roller journalled in said bearing brackets, said roller and bearing brackets being positioned in the vicinity of the end of the pan covered by the sloping top 5. 9 is a depending strut secured to the bottom of the pan 4 in the vicinity of its other end for keeping the bottom of the pan level, said pan being supported on the roller and strut.

10 is a handle provided on the forward vertical face of the pan and 11 is an upwardly extending lip positioned about the forward end of the pan 4 and having an inwardly turned upper edge. 12 are corner orifices in the lip 11.

13 is an opposed lip extending upwardly about the rear end of the pan 4 and having an inwardly turned upper edge.

14 is an overflow orifice extending through the forward vertical face of the pan at the required height.

My device is used as follows:

The usual refrigerator flap 3 is turned up and the pan inserted under the drip pipe 2, said pan lying in the horizontal position illustrated in Figures 2 and 3. The water from the drip pipe 2 will fall onto the inclined top 5 and flow down into the pan. When the pan is filled to its maximum capacity the water will flow out of the overflow orifice 14, giving warning of such condition.

In order to remove the pan it is merely necessary to pull the same out by the handle 10 and such operation will be accomplished with ease if the forward end of the pan is slightly lifted so that the strut 9 will clear the floor, allowing the pan to roll on the roller 8. When the pan is clear of the refrigerator it can be swung into the vertical position illustrated in Figure 4 wherein the water in the pan will flow into the pocket 15 constituted between the bottom of the pan, the rear face and the inclined top 5 and can then be moved to where it can be conveniently emptied. The emptying is effected by gradually inverting the pan so that the water flows out either one of the orifices 12 in the lip 11, such inwardly turned lip preventing the water splashing over.

The lip 13 is provided for the purpose of preventing any condensation on the top 5 or any drips flowing onto the floor when the pan is raised into the vertical position illustrated in Figure 4.

From the above description it will be seen that I have devised a simple and effective drip pan which can be moved about with great ease when full of water for the purpose of emptying and moreover one in which there will be no liability of the water therein splashing onto the floor.

Further I have devised a pan which can be readily handled with one hand and as a space is left between the free edge of the top 5 and the forward vertical face of the pan, can be cleaned with the minimum of trouble.

Although I have described my pan as being particularly applicable to use as a drip pan for refrigerators, it is to be understood that it could with equal facility be used for containing any liquid such as water, oils, chemicals or the like where the pan is normally used in a horizontal position for receiving the liquid. It will be particularly applicable for use under automobiles to catch oil and for other similar uses.

What I claim as my invention is.

1. A liquid container comprising a casing having an inclined top extending between the side walls from a position intermediate of the length of the casing to one end wall thereof, said casing having discharge orifices in the vicinity of the other end wall, a roller journalled under the bottom of the casing in the vicinity of one end and means for supporting the other end of the casing so that the bottom is substantially horizontal.

2. A liquid container comprising a casing having an overflow orifice in one of the end walls thereof and an inclined top extending between the side walls from a position intermediate of the length of the casing to one end wall thereof, an upwardly extending lip secured about the end of the casing to which the inclined top is secured, said lip having an inwardly turned upper edge and a second upwardly extending lip positioned about the other end of the casing and having an inwardly turned upper edge, said second mentioned lip having discharge orifices therein.

3. A liquid container comprising a casing having an overflow orifice in one of the end walls thereof and an inclined top extending between the side walls from a position intermediate of the length of the casing to one end wall thereof, an upwardly extending lip secured about the end of the casing to which the inclined top is secured, said lip having an inwardly turned upper edge and a second upwardly extending lip positioned about the other end of the casing and having an inwardly turned upper edge, said second mentioned lip having discharge orifices therein, a roller journalled below the bottom of said casing in the vicinity of one end thereof, a depending strut in the vicinity of the other end of the casing and a handle on the end wall of the casing remote from the end to which the top is secured.

4. A liquid container comprising a casing and an inclined top extending between the side walls from a position intermediate of the length of the casing to one end wall thereof, an upwardly extending lip secured about the end of the casing to which the inclined top is secured, said lip having an inwardly turned upper edge and a second upwardly extending lip positioned about the other end of the casing and having an inwardly turned upper edge.

GEORGE FALCONER IRONS.